Oct. 11, 1938.    W. T. MURDEN ET AL    2,132,752
CONTROL MECHANISM FOR RATIO CHANGING TRANSMISSIONS
Filed April 29, 1935    3 Sheets-Sheet 3

Inventors
William T. Murden &
Thomas C. Delaval-Crow
By Blackmore, Spencer & Flint
Attorneys Patented Oct. 11, 1938

2,132,752

UNITED STATES PATENT OFFICE 2,132,752

CONTROL MECHANISM FOR RATIO-CHANGING TRANSMISSIONS

William T. Murden and Thomas C. Delaval-Crow, Bristol, Conn., assignors to General Motors Corporation, Detroit, Mich., a corporation of Delaware Application April 29, 1935, Serial No. 18,723

4 Claims. (Cl. 74—190.5)

This invention relates to control mechanism for a ratio changing transmission adapted to be used with an electrically driven motor. More particularly the control mechanism is designed for use with a ratio changing transmission, the parts of which are incapable of relative movement when not operating to transmit motion.

It is an object of the invention to provide a control mechanism which is adapted to automatically shift the ratio changing transmission toward its low ratio position in the event that the electrical energy fails to operate the motor.

Another object is to provide, with such a control, manually operable means to reset the ratio changing means after such an automatic "return to low", and means to effect such ratio changing as may be desired during the operation of the device.

In the drawings,

Fig. 5 is a diagrammatic view.

Figure 1:
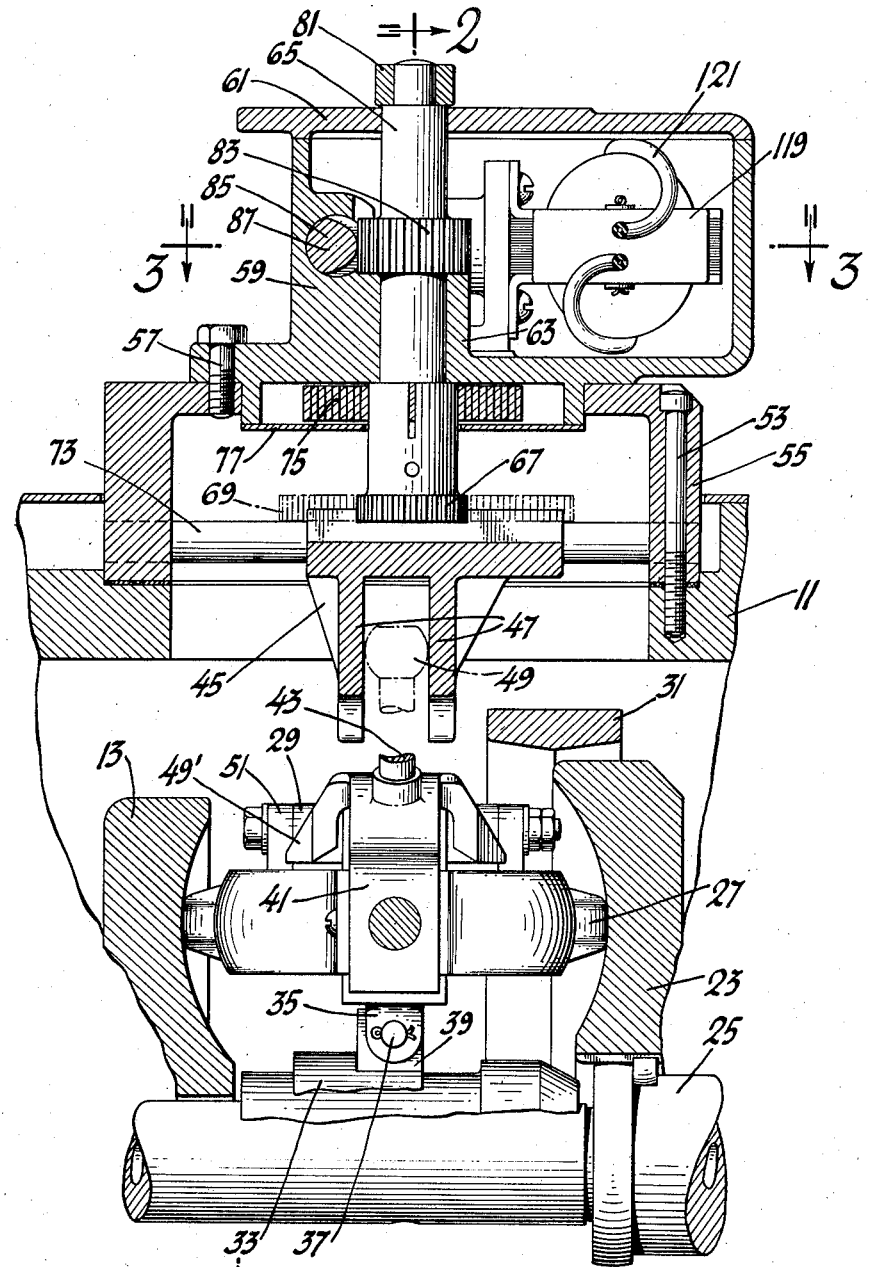
Fig. 1 is a vertical transverse section through a ratio changing device and the control mechanism therefor, the section being substantially on line 1—1 of Fig. 2 and showing the roller in elevation.
Figure 2:
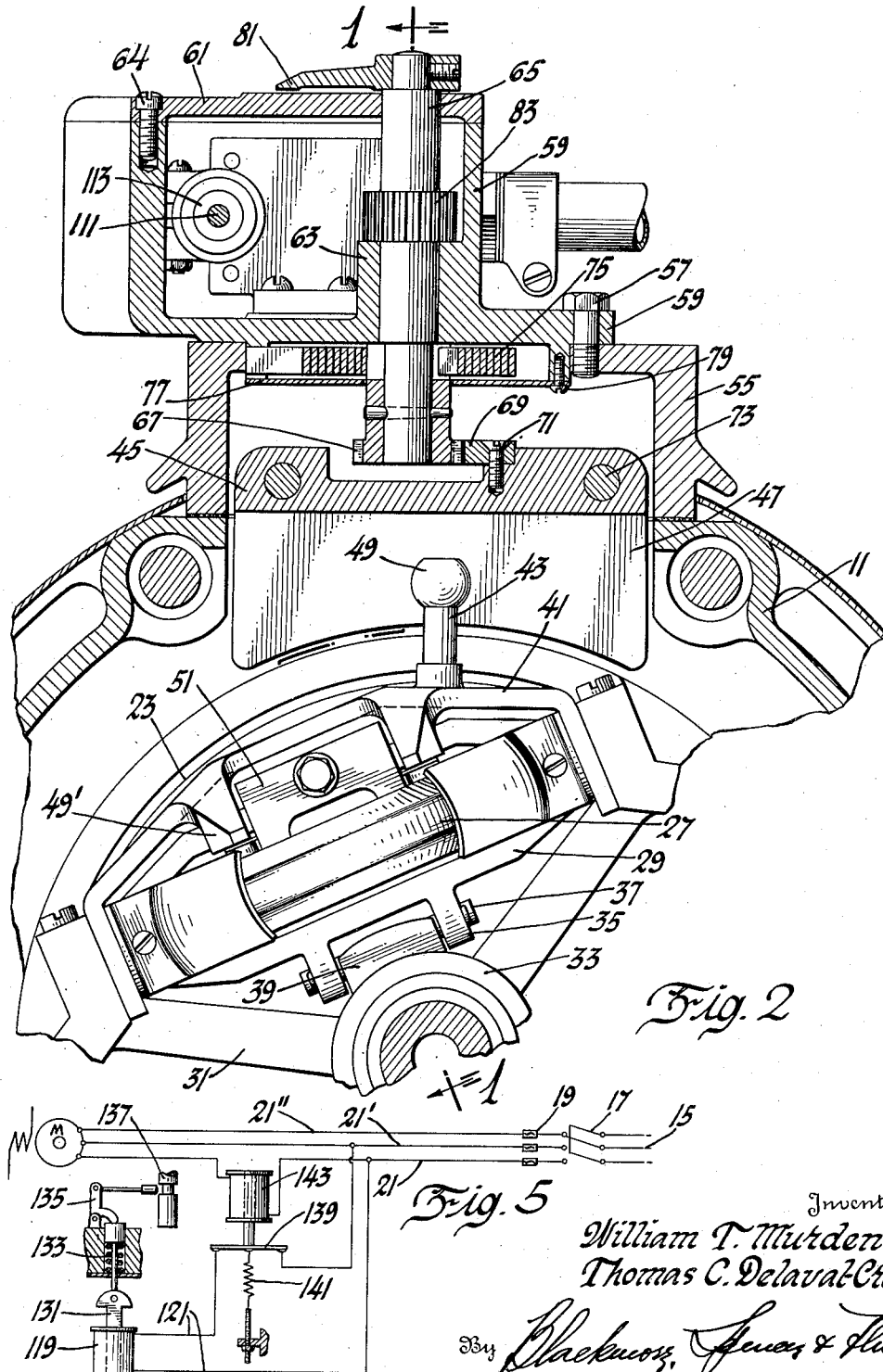
Fig. 2 is a longitudinal vertical section through the same parts, the section being on line 2—2 of Fig. 1.

Referring by reference characters to the drawings, numeral 11 is used to designate a housing for a ratio changing transmission having a driving race 13 which is rotatable under the influence of a motor, not shown. This motor may be an electric motor as suggested by M in Fig. 5. For the operation of this motor there is shown a main line 15, a switch 17, fuses 19, and conductors 21, 21′, 21″. The ratio changing transmission also includes a driven race 23 mounted to rotate with driven shaft 25. This is a well known form of transmission wherein the tilt of the rollers, one of which is shown at 27, determines the rate of rotation of race 23 and shaft 25 relative to the rate of rotation of the input race 13. It is unnecessary to show the conventional torque loading details by which the pressure between the rollers and the races is varied with the load, since these details are not a part of this invention. Of the several rollers the one marked 27 may be considered to be the so-called master roller. Like the others it is mounted for rotation in a carrier 29, the latter rotatably supported in the arms 31 of a spider. Each carrier is operably connected to a sliding sleeve 33 by means of arms 35 and a pin 37, the latter engaging a lug 39 on the sleeve 33. By this means the tilting of the carrier of the master roller similarly tilts the follower roller carriers. The master roller is preferably tilted by being given an inclination about its points of race contact. This is accomplished by an inclining member 41 journaled for rotation on the axes of rotation of the roller carrier, and it is rotated by the rocking movement given an arm 43 by a sliding member 45, the latter having arms 47 engaging the ball 49 on the end of arm 43. The process by which the rocking of element 41 inclines the roller by means of lugs 49′, by which the roller, when so inclined, automatically assumes a new tilt and in doing so tilts the carrier by means of its pivoted members 51 need not be described as this is not, per se, a part of this invention and because it is a well known process.

A change speed transmission of this kind should be started with the rollers in low ratio position. When the rollers and races are not rotating it is difficult or impossible to shift the rollers to this low ratio position. This invention, then, has for its major object to provide means to effect an automatic shift to low ratio whenever the electric power for the motor is cut off. With such a provision the starting will be always with a low ratio transmission. For the attainment of this purpose the following structural arrangements have been designed.

Located above the transmission housing 11 and secured thereto by fastening means 53 is a box 55. Secured to the box by fastening means 57 is a housing 59 having a covering 61 secured as at 64. Journaled in the cover 61 and in a boss 63 of the housing 59 and extending into box 55 is a spindle 65. Within the box the spindle carries a pinion 67 meshing with rack 69 secured at 71 to the element 45 referred to above. This part 45 slides on rods or rails 73 carried by the box, and, as it slides, it rocks part 41 and changes the driving ratio position of the several rollers. A coil spring 75 is secured at its center to the spindle and, at its periphery, is anchored as may be convenient. It functions to rotate the spindle in a direction to shift the transmission to low ratio. There is shown a cover plate 77 and fastening means 79 to enclose the spring. A pointer 81 secured to the spindle above the cover 61 serves to indicate the position of the ratio carrying rollers. Suitable indicia may be provided on the cover if desired.

Within the housing 59 the spindle is provided with a gear 83 engaging a worm 85 on a shaft 87, the latter slidable in a bore 89 of the housing. This bore is enlarged in diameter at 91 to receive a sleeve 93 surrounding the shaft. The shaft has an elongated slot 95 into which projects the reduced end of a pin member 97 threaded into a handle 99 and extending through the sleeve. A knob 101 is secured to the end of the shaft by fastening means 103. A locking member 105 is threaded into the housing adjacent the enlarged part of the bore and enters an annular groove 107 in the sleeve, permitting the sleeve to rotate but preventing its reciprocation.

The shaft 87 has an annular groove 109 which may be engaged by a pin 111. This pin is slidably mounted in a box 113, a spring 115 within the box tending to hold the pin at its outward limit of motion as will be seen in Fig. 3. A spring 117 functions to project the box with the pin upwardly and thus to lift the pin from the groove as will be seen by an inspection of Fig. 4. Within the housing is a solenoid 119 supplied by a branch circuit 121 from main conductors 21 and 21' (see Fig. 5). This solenoid pulls an armature 123 and thus rotates a lever 125. The lever is fulcrumed at 127, engages the armature at 129 and its other end is operable to push downwardly upon the box 113 against the resistance of spring 117. If the groove is opposite the pin 111 the latter enters the groove. If not, the action of the solenoid tensions spring 115 so that it will project the pin into the groove when the plunger moves to permit it to do so.

Figure 3:
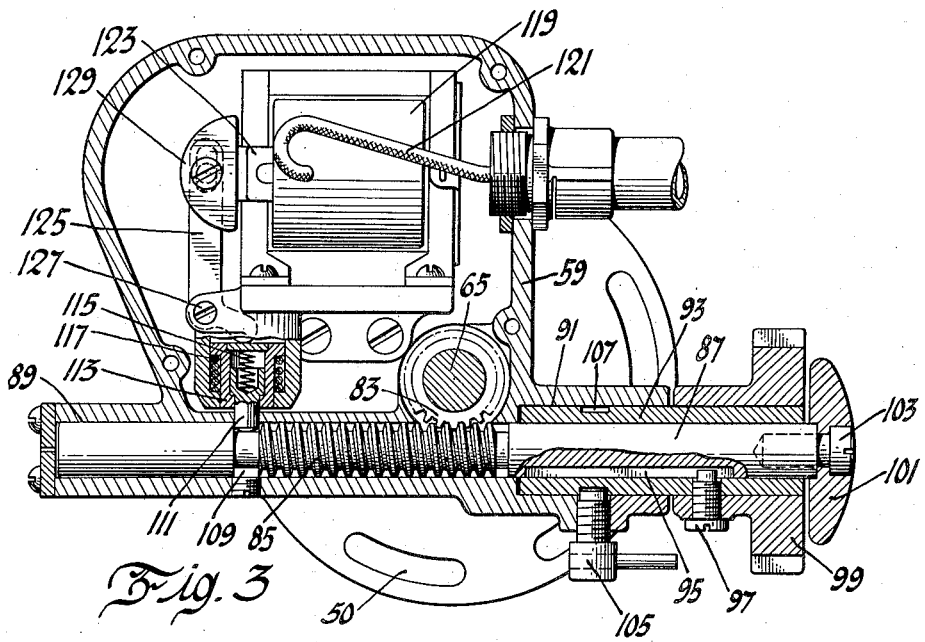
Fig. 3 is a horizontal section corresponding to line 3—3 of Fig. 1.
Figure 4:
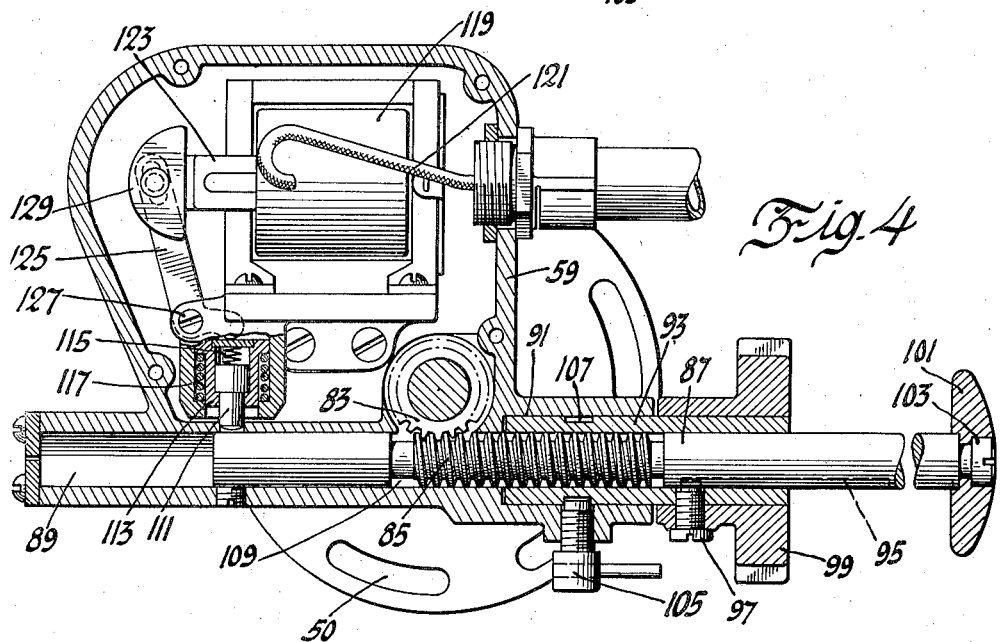
Fig. 4 is a view similar to Fig. 3 with the parts displaced.

From an examination of Fig. 5 it will be understood that numeral 119 is the equivalent of the solenoid shown in Figs. 3 and 4; that 131 is the armature; that 133 is the equivalent of the spring 117. Numeral 135 is the diagrammatic equivalent of lever 125. Numeral 137 corresponds with the plunger 87. As shown in this figure, the branch circuit includes a switch 139 normally closed by a spring 141 but which may be opened by an excessive current through the main conductor 21 such as may occur when the motor is overloaded, this opening being effected by a solenoid 143 operable under the influence of the excessive current in main conductor 21 to overcome spring 141 and open the switch. This provision for overload is not, however, a part of our invention.

The operation is substantially as follows: If the motor is rotating and the pin 111 is in the notch 109 as shown in Fig. 3, the driving ratio may be changed as desired by rotating the handle 99. In so rotating the handle the sleeve 93 and the shaft 87 rotate together. The shaft cannot reciprocate because it is locked from doing so by pin 111. When rotated without reciprocation, it necessarily turns the worm gear 83, shaft 65, and pinion 67. This reciprocation of member 45 changes the driving ratio. If the current supplying the motor should fail, or if, because of excessive current in the conductor 21 resulting from an overloaded motor, switch 139 should open, the solenoid 119 releases its hold on the armature and the lever 125, the spring 117 then raises the pin 111 from the recess 109. Spring 75 then rotates the spindle 65, simultaneously reciprocating shaft 87 to the position shown by Fig. 4. This rotation of the spindle 65 restores the transmission to low ratio so that when the current again becomes effective to drive the motor, the motor operates with the transmission in low ratio. The ratio at which the motor was operating may be readily restored by pushing the plunger 87 back to the position shown in Fig. 3, whereupon the pin 111 locks the plunger from further reciprocation. It is possible to accomplish this reciprocation of the plunger because the races and rollers are now in motion.

Figs. 3 and 4 show slots 50 for fastening means 57 so that the housing may be secured in adjusted positions to the end of locating the handle and knob conveniently for the operator in whatever position the power unit may be installed. This adjustment is also convenient in the event that the plunger 87 should be operated from a remote point by a flexible cable or otherwise.

We claim:

1. Control mechanism for a ratio changing transmission, said mechanism comprising yielding means to bias said transmission toward its low ratio position, electrically responsive means to render said yielding means inoperative, and manually operable means to vary the ratio of said transmission, together with manual resetting means mounted for reciprocation by said yielding means, said manually operable means and resetting means being coaxially arranged, and means to permit reciprocation of the resetting means relatively to the manually operable means but to prevent relative rotation thereof.

2. Control mechanism for a ratio changing transmission for use with an electric motor, said mechanism comprising a reciprocable ratio shifting member, a rotatable spindle, gearing between said spindle and shifting member, a manually operable rotatable and reciprocable shaft, gearing between said spindle and shaft, yielding means operable on said spindle to move said shifting member to its low ratio position, and means responsive to the source of energy supplying said motor to lock said shaft from reciprocation and thereby render said yielding means inoperative, the manual rotation of said shaft operable to rotate said spindle and change driving ratios.

3. The invention defined by claim 2, said shaft locking means including a pin radially engaging said shaft, a spring to bias said pin to shaft releasing position, and a solenoid operable to overcome said spring and project said pin into locking position.

4. The invention defined by claim 2 together with a sleeve surrounding said shaft, means to prevent relative rotation of said sleeve and shaft but to permit reciprocation of the shaft relative to the sleeve and an operating handle on said sleeve.

WILLIAM T. MURDEN.
T. C. DELAVAL-CROW.